Figure 1:
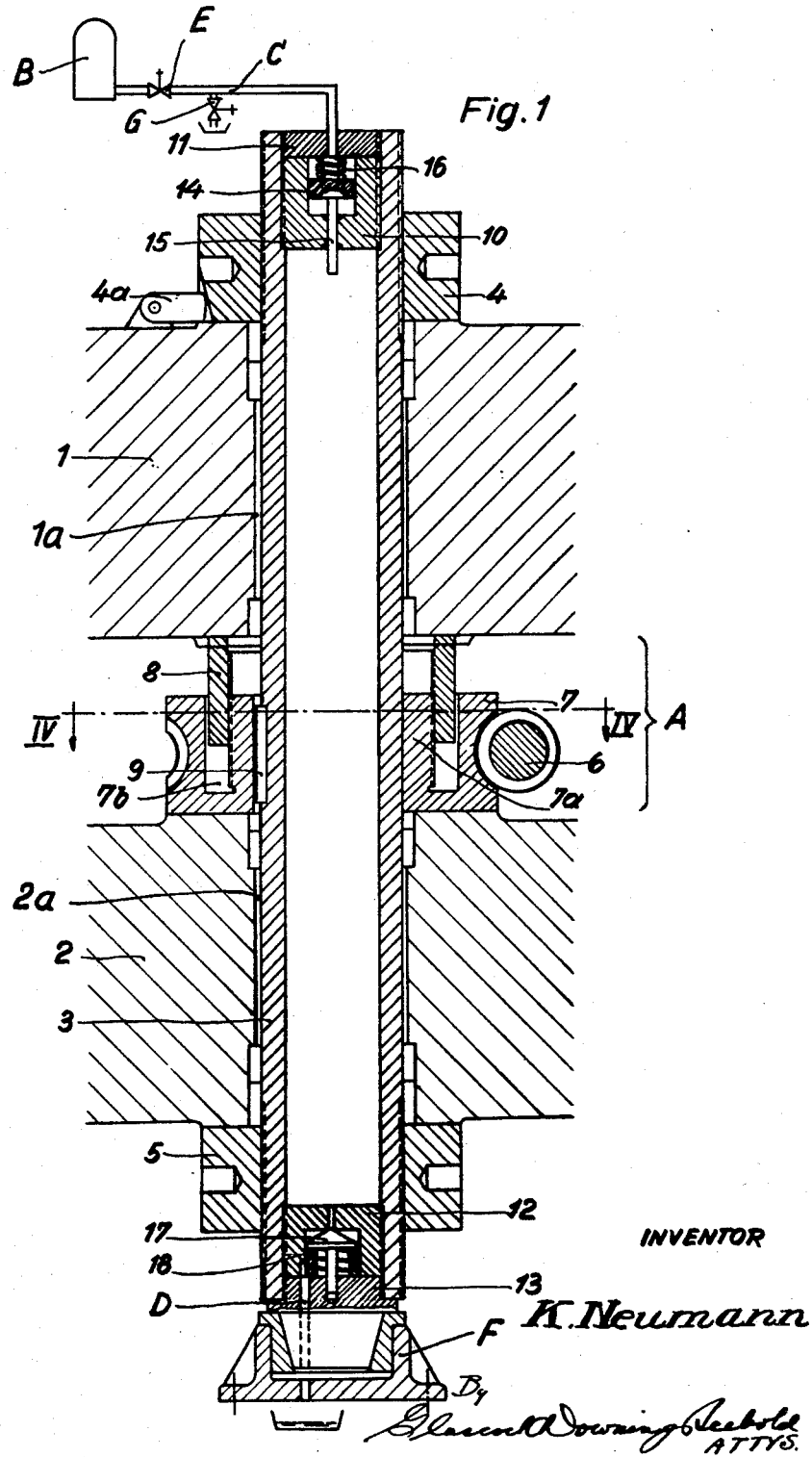

May 3, 1960  K. NEUMANN  2,934,969
ADJUSTING MECHANISM
Filed Sept. 11, 1958  5 Sheets-Sheet 4

INVENTOR
K. Neumann
By Glascock Downing Seebold
ATTYS.

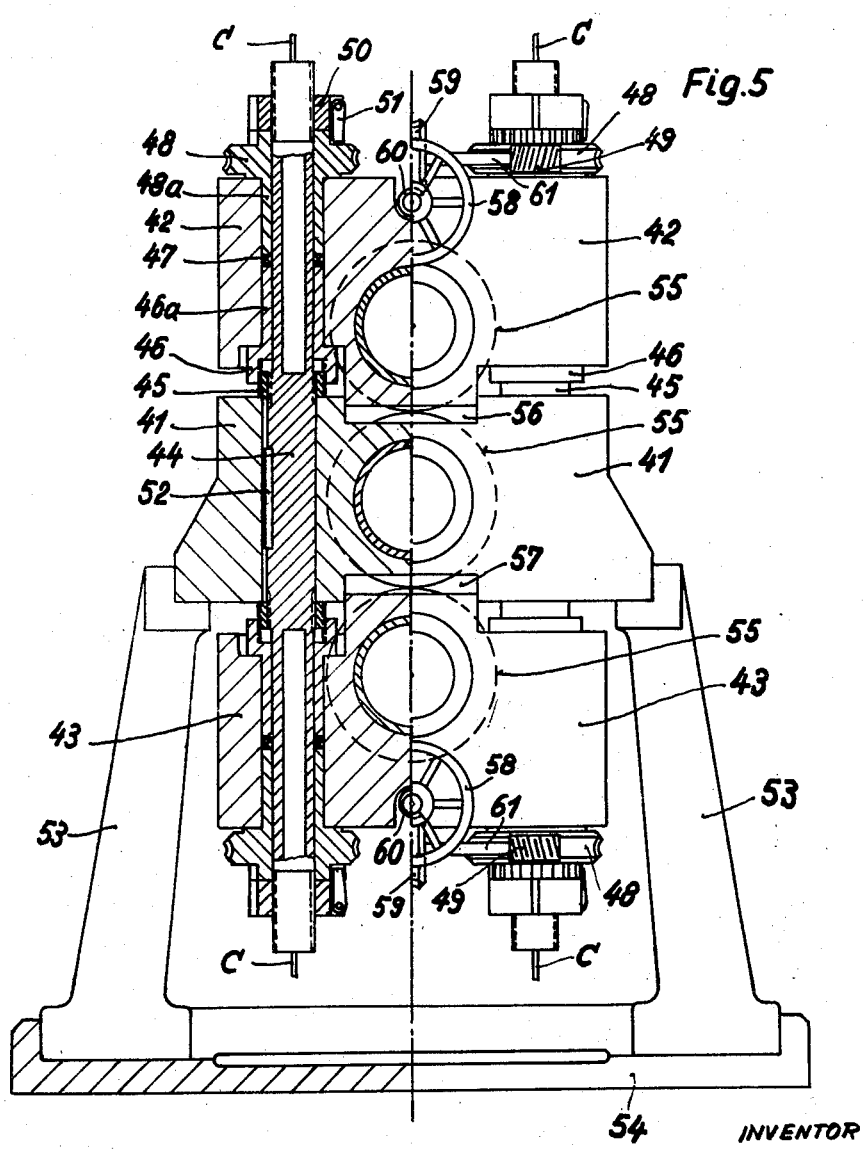

United States Patent Office 2,934,969
Patented May 3, 1960

2,934,969

ADJUSTING MECHANISM

Karl Neumann, St. Ingbert, Saar, Germany, assignor to Moeller & Neumann G.m.b.H., St. Ingbert, Saar, Germany Application September 11, 1958, Serial No. 760,422

8 Claims. (Cl. 74—424.8)

The present invention relates broadly to the art of adjusting mechanisms for varying the spacing between two opposed structural elements.

More particularly, this invention relates to an adjusting mechanism of what can be termed the nut and spindle type operative to vary the relative positions between two elements.

The invention is specifically related to the problem of adjusting the rolls in rolling mills by adjusting the roll supporting elements which are variably termed in the art as chucks, housings or bearing blocks and in which such roll supporting elements are connected in spaced relation by means of spindles or stay bolts having tightening nuts at their opposite or outer ends and provided with spacing components that are relatively axially adjustable and which spacing components are located between the tightening nuts.

Rolling mills of this type are known as frameless rolling mills.

In general, therefore, the present invention is applicable to the adjustment of the spacing between at least two opposed elements.

Adjusting mechanisms for frameless rolling mills are known which include components for effecting what can be termed a rough or initial adjustment comprising shiftable wedge shaped spacing members positioned between the roll mounts or housings and in which a fine adjustment is obtained by rotating bearing bushings having an eccentric bore accommodating the roll necks or journals. Such known mechanism includes stay bolts having end nuts that have to be loosened when a rough adjustment is made and which nuts later have to be retightened. This manipulation of the end nuts can only be effected during the mounting or demounting of the roll assemblies, which results in that a very large range of adjustment must be accommodated by the turning of the bearing bushings. Obviously, this relationship necessitates the provision of a substantial or considerable eccentricity in the bores in the bearing bushings and, therefore, due to space conditions, this large eccentricity is provided at the expense of the diameter of the heavily loaded bearing journals. On the other hand, with this type of adjusting mechanism no weight balancing for the upper roll is required.

In addition to the foregoing, it is known to provide an adjusting mechanism for a frameless rolling mill which includes a nut and spindle mechanism and wherein sleeve-like end nuts serve as adjusting nuts. In this relationship a weight balancing, such as a hydraulic spreading mechanism is provided between the roll mounts or chucks since the adjusting nuts per se can effect adjustment in one direction only. If the spindle or stay screw mechanism is to be pretensioned or prestressed the tensioning force must be provided by the spreading device. Therefore, this spreading device can, in this respect, be classified with the known wedge shaped spacer components positioned between the roll mounts.

The present invention, therefore, has for an object to provide an adjusting mechanism of the nut and spindle type for varying the spacing between at least two opposed elements such as the roll journalling chucks or mounts of rolling mill rolls which includes inelastic or rigid acting spacer components positioned between the elements to be adjusted and movable axially relative to one another and with such spacer components so cooperatively associated with the spindle or stay screw means and tightening nuts that the relative axial adjustment of the spacer components simultaneously effects the axial position of the tightening nuts relative to the stay screw or spindle means so that for each adjustment, the roll mount or mounts to be adjusted will always remain clamped between rigid parts.

It is a particular object of the invention to provide spacing components including an annular threaded member surrounding the spindle or stay screw means and supported or braced against one element to be adjusted and another annular threaded member cooperably related with the first and supported or braced against the other element to be adjusted, one of these threaded members is rotatable relative to one element to be adjusted, while the other threaded member is fixed relative to the other element to be adjusted, whereby the turning of said one threaded member initiates another relative rotary movement for adjusting the tightening nut or nuts relative to the stay screw or spindle means in the same degree and direction as the adjusting movement of the element or elements. Consistent with the foregoing, it is an object of the invention to provide a driving or turning connection between the rotatable threaded member and the tightening nuts by utilizing the spindle means in that the rotary motion of the rotatable threaded part is transmitted to the spindle means which in turn is rotatably mounted in combination with locking mechanism for preventing the turning of the tightening nut or nuts so as to obtain a relative axial movement between the spindle means and tightening or compression nut or nuts.

Furthermore, if the adjusting mechanism includes an element for pretensioning or prestressing the stay screws or spindle means, the contact pressure between the threaded parts of the adjusting mechanism is so high that adjusting movements are either not possible or effected only by the exertion of an extremely strong rotary force. With this relationship it is desirable to unstress the stay screw or spindle means during adjustment of the position of the elements. A hydraulic mechanism for stressing and unstressing a stay screw or spindle means which is set forth in the following description is the claimed subject matter of a separate application.

The present invention has for an additional and more specific object to provide adjusting mechanism of the type described in which the coacting, threaded annular members are positioned between the elements to be adjusted, that is, the roll mounts of a rolling mill and in which components for applying rotation to one of said annular members are mounted on that side of the element or housing to be adjusted that is remote from the gap between the housings.

Consistent with the foregoing object of the invention, it is a more specific object to couple a drive wheel with the rotatable annular threaded member and with the stay screw or spindle means which results in that the stay screw or spindle means can be utilized as a force transmitting member for driving a threaded annular part and also for effecting relative axial movement between the spindle means and a tightening nut that is locked against rotation.

Additionally, the present invention has for an object to provide an adjusting mechanism of the type mentioned in which a rotary adjusting member is positioned on the side of the housing or element to be adjusted remote from the gap between the elements and in which the rotatable annular threaded member is coupled to said adjusting member by means of tubular extensions disposed within the element to be adjusted and in which the stay screw or spindle means is nonrotatably fixed in the other element or housing. This just described relationship is particularly suited to obtaining a mutual independent adjustment of the upper and lower roll mounts in a 3-high rolling mill, which adjustments would be difficult to obtain with rotatable stay screw or spindle means. Therefore, the invention provides, in a 3-high rolling mill stay screw means fixed rigidly in the middle roll housing or mount, a cooperable pair of annular threaded members associated with the gaps between the respective roll housings and in which each rotatable annular threaded member is turned by a rotary drive component disposed respectively on the upper and lower sides of the upper and lower roll housings, and in which tightening nuts are associated with the stay screw means, and lock means are provided to couple the tightening nuts with the respective drive components.

Figure 2:
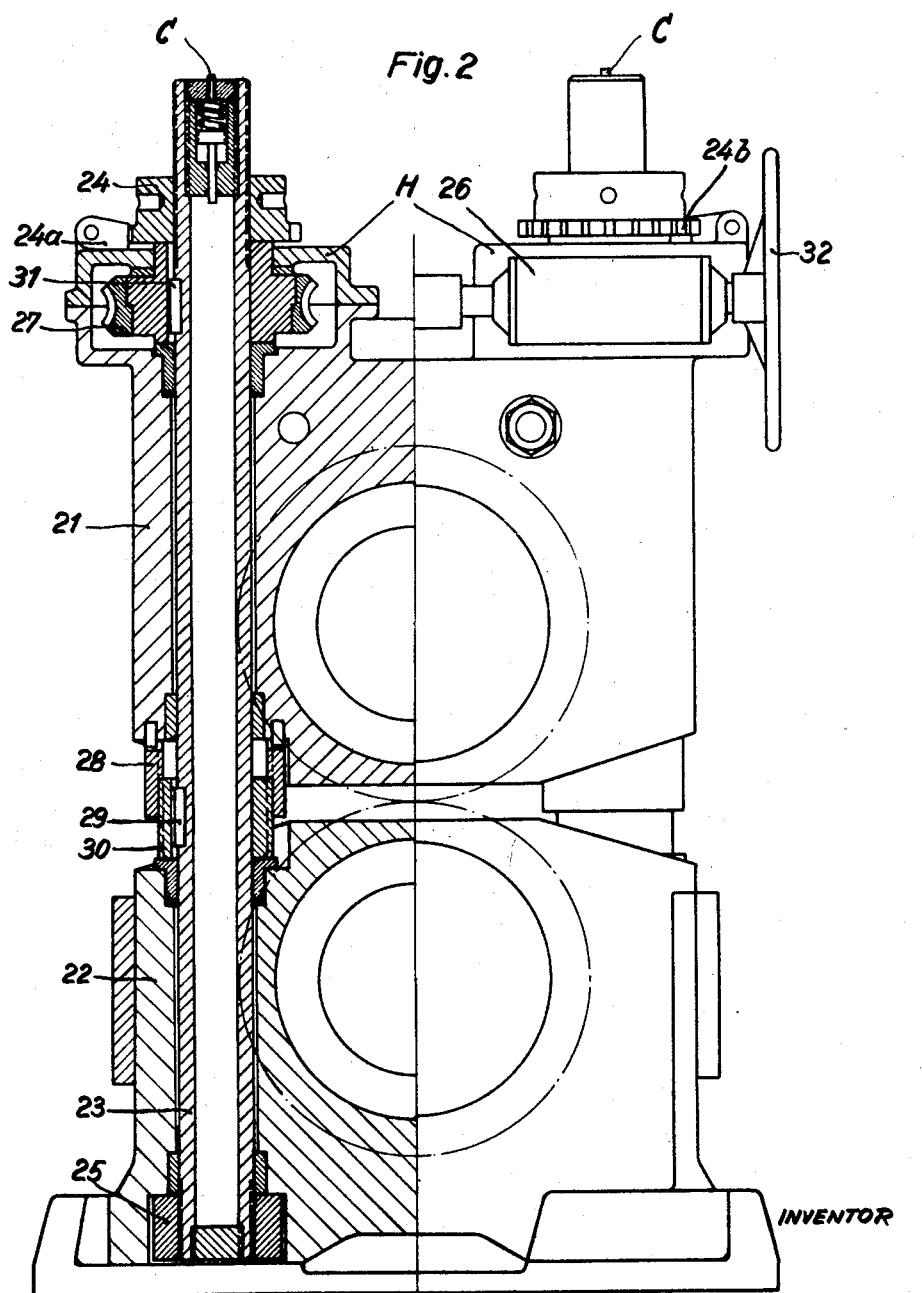
Figure 3:
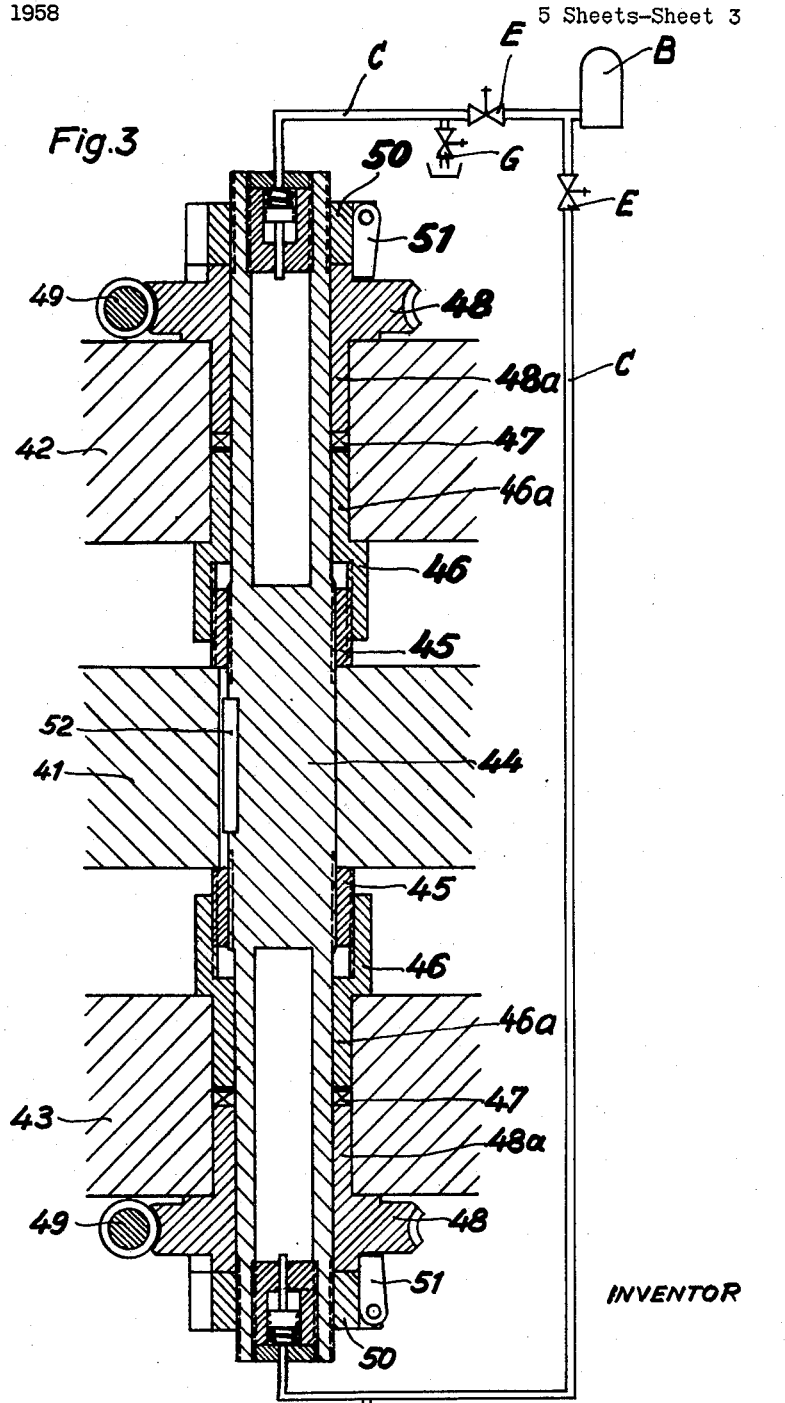
Figure 4:
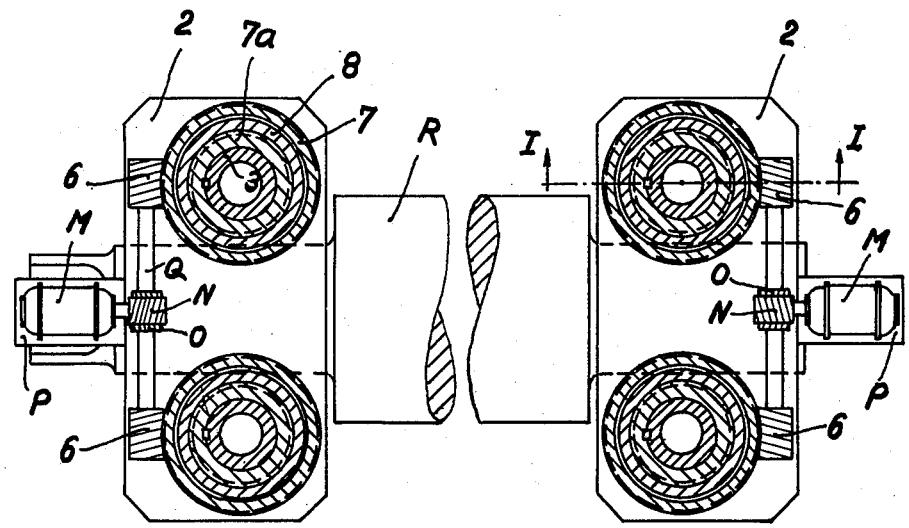

Further and more specific objects will be apparent from the following description taken in connection with the accompanying drawings in which:

Figure 1 is a fragmentary longitudinal sectional view illustrating one embodiment of the invention in which the cooperable annular threaded members and the drive components therefor are mounted in the gap between the elements or roll housings to be adjusted, Figure 2 is a view partly in vertical section and partly in elevation of a frameless 2-high rolling mill incorporating an adjusting mechanism of the invention including rotatable stay screw or spindle means, Figure 3 is a view similar to Figure 1 but illustrating an adjusting mechanism for a 3-high rolling mill, Figure 4 is a horizontal section following line IV—IV in Figure 1, illustrating the disposition of the lower roll of a 2-high rolling mill in the mounts or chucks and the disposition of four adjusting mechanisms, and Figure 5 is a view partly in vertical section and partly in elevation of a frameless 3-high rolling mill corresponding with Figure 3.

It is apparent that there are a plurality of stay means or spindles supporting the roll housings, so that the rolls carried by the housings are arranged in operative relationship, one above the other.

Referring to Figure 1, there is illustrated a frameless 2-high mill including upper and lower roll housings 1 and 2 respectively which receive the journals or necks (not shown). The roll housings 1 and 2 are provided with through bores 1a and 2a respectively, which bores are in alignment and are adapted to receive a hollow spindle or pipe 3 whereby the roll housings are connected together and are held in proper relationship by means of tightening nuts 4 and 5 threaded on the stay screw to bear against the exposed faces of the housings 1 and 2 respectively. A pivoted locking means 4a carried by the exposed face of the roll mount 1 cooperates with the periphery of the tightening nut 4 to prevent rotation of the nut.

Positioned in the space or gap between the roll housings 1 and 2 is a spacer means denoted generally A and such spacing means includes a drivable adjusting element 7a secured to the hollow spindle 3 by means of a key 9 and the drivable adjusting element 7a is rotatably supported on the lower roll housing 2. The drivable adjusting element 7a is formed as a worm wheel 7 which meshes with a worm 6 so that upon rotation of the worm 6, turning movement is imparted to the element 7a, and by virtue of its connection to the hollow spindle, the hollow spindle 3 will be simultaneously turned.

An annular nut 8 is nonrotatably connected to the upper roll housing 1 and is provided with a female thread cooperable with a male thread formed in the inner wall of an annular groove 7b provided in the drivable adjusting element 7.

When the above named structural components defining the spacing means A are mounted and positioned as shown, and the tightening nuts 4 and 5 drawn up on the hollow spindle 3 so that no play exists between the roll housings 1 and 2 and the nuts 4 and 5, as well as no prestressing, the distance between the housings 1 and 2 is determined at a given overall height of the drivable adjusting element 7a and the nut 8.

If the thread of the nut 8 has the same pitch as the thread of the tightening nut 4 and if the nut 4 is held against rotation by the actuation of the locking means 4a and with the nut 5 rotatable with the spindle 3, rotation of the worm 6 will raise or lower the roll housing 1, which of course depends on the direction of rotation, relative to the lower roll housing 2 by virtue of the threaded coaction between the drivable adjusting element 7a and the nut 8. Of course, the lower roll housing 2 remains in its initial position.

Simultaneously, due to the fact that the drivable adjusting element is fixed on a hollow spindle 3 and the nut 4 is held against rotation, the nuts will be tightened.

However, if nut 4 and nut 5, which latter nut may be provided with a locking means such as 4a are prevented from rotating by actuation of such locking means, and if the pitch of the thread of the nuts 4 and 5 is one-half the pitch of the thread of the nut 8, and if the nuts 4 and 5 have opposed threads, upon the rotation of the worm wheel 6 the roll housings 1 and 2 will move toward or away from each other to the same extent as measured from the center plane of the gap between the rolls. In this assemblage, the lower bottom surface of the hollow spindle rests on footing F.

Generally, it will be sufficient to raise and lower the roll housing 1 but there are rolling mills in which it is desirable that the determined height of the center between the rolls should remain fixed and, in such situation, the roll housings 1 and 2 should be movable in the manner just described.

To produce readily the prestressing of the hollow spindle 3 and to permit the easy unstressing thereof prior to the actuation of the adjustment means, the upper end of each spindle 3 is closed by a closure element 10 having a bore therein and a cover 11 is positioned above the element 10. The lower end of each spindle is closed by a closure element 12 having a bore therein and a cover 13. A multiplier is provided and is defined by a piston 14 located in the bore, a plunger 15 extending from the piston through the element 10 and into the hollow spindle and a tension spring 16 between the piston and the cover 11. A check valve 17 is positioned in the bore of the element 12 and cooperates with a port in the base of the element and the valve is normally urged to the closed position by a very strong spring 18 lodged between the valve head and the cover 13. A drain D opening in the cover leads to the outside of the footing.

If the interior of the spindle is filled with liquid and pressure is applied to the piston 14 through an opening in the cover 11, such pressure is multiplied in accordance with the ratio of the diameter of the piston 14 to the diameter of the plunger 15 and acts upon the fluid within the spindle 3. A strong tension is generated in the spindle 3 and the spindle elongates by virtue of this tension effect. Play develops between the upper or exposed surface of the roll housing 1 and the lower surface of the tightening nut 4 or between the lower or exposed surface of the roll housing 2 and the upper surface of the tightening nut 5, or between both tightening nuts and both roll housings. One of the nuts 4 or 5 can then be tightened without play. If the pressure is removed from the multiplier, the spindle 3 tends to contract so that roll housings 1 and 2, spindle 3, tightening nuts 4 and 5, the drivable adjusting element 7a and the nut 8 are under strong prestress. Under such conditions, the worm 6 cannot be rotated since the force required is too great for any practical application.

The rolling is performed with this prestressing and if the center distance between the two rolls is to be changed for any reason such as wear, or corrective measures, pressure is again applied to the multiplier, whereupon the spindle 3 lengthens and all components prestressed become stress free; it is now quite easy to rotate the worm 6 and thereby change the middle distance between the two rolls.

When such desired distance has been obtained, the pressure acting upon the multiplier is removed whereupon a hollow spindle contracts and the various components specifically referred to are again strongly prestressed.

It is also to be undersood that it is within the scope of the present invention to mount the nut 8 for rotation and fix the adjusting element 7a against rotation.

It is known to develop a shrinking tension in the columns of presses, more particularly, in connection with the struts or girders supported by the columns by introducing into the hollow end portions of the columns, a heating mechanism or an electric heating rod to utilize heat to elongate the ends of the columns prior to tightening of the nuts on the columns. This heating relationship can be used only if sufficient time is available to heat the ends of the columns to be tensioned. In addition, it is difficult to adjust accurately to a desired tension, a factor which is quite important in view of existing calculating methods to determine the variable loading of expansion screws.

Referring to Figures 1 and 3, the working pressure for the spreading of the hollow spindles is taken from a fluid accumulator B which is connected to the pressure chamber of piston 14 through pipe line C. Valves E are provided for opening and closing pipe lines C. The valves G are provided for the relief of the pistons 14, when valves E are closed, whereby a hollow spindle which has spread before is contracting again. The working pressure in the accumulator B is so high that, when considering the transmission ratio in the multiplier device, a pressure of about 600 to 800 atm. is obtained in the liquid of the hollow spindle, if the plunger 15 dips into the liquid filling. The possible dipping-amount of the plunger 15 as shown in the drawings is sufficient for producing this pressure, which causes the desired spreading of the hollow spindle. A spreading amount by less than 1 mm. is in many cases sufficient to eliminate the stresses from the system.

The spring 18 of the check valve 17 has to be so strong that by the high internal pressure in the hollow spindle no liquid is dropping out. Valve 17 is—among others— a precaution device in case the accumulator B is overloaded and hollow spindle 3 might receive a permanent deformation. If liquid has dropped out through drain D, the filling of the hollow spindle has to be replenished by screwing off cover 11 and removing the spreading devices 14, 15 and 16.

From Figure 1 it will be appreciated that the drive for the spacer means A is located in the gap between the components to be adjusted, but it is customary and more efficacious in conventional adjustment means to locate the drive on that side of the component to be adjusted which is remote from the gap. To accomplish such ends, the drive component or worm wheel as well as the adjusting element are connected rotatably with the hollow spindle. By virtue of this arrangement, the spindle can be employed as transmission means for rotary movement as well as transmitting a rotary drive for the adjustment of a nut fixed against rotation.

Additionally, the drive wheel or worm wheel located remote from the gap is rotatably connected with the adjusting element through a sleeve like extension between the drive wheel and the roll housing and with the spindle being nonrotatably mounted in the adjacent roll housing. This particular assemblage is suitable for the mutually independent adjustment of the upper and lower roll housings of a 3-high mill wherein it is difficult to operate with rotatable spindles.

In Figure 2 which is a 2-high mill, upper and lower roll housings 21 and 22 are provided with aligned bores in which is disposed a hollow spindle 23. Tightening nuts 24 and 25 are threaded on to the spindle in proximity to the upper and lower ends thereof.

The spacing means is defined by a threaded annular nut 28 and a threaded annular adjusting element 30. The annular element 30 is threaded on its outer periphery and is rotatably supported on the lower roll housing 22 and is secured to the spindle 23 by means of a key 29. The annular nut 28 is nonrotatably connected to the upper roll housing 21.

The drive for the annular adjusting element 30 includes a worm wheel 27 secured to the spindle 23 by a key 31 and the worm wheel is located in a housing H carried by the upper part of roll housing 21 or at a position which is remote from the gap between the rolls. A housing 26 for a worm rotatable by manipulation of a hand wheel 32 is cooperable with the worm wheel 27 to rotate the same.

It will be seen that the tightening nut 24 is supported on the worm wheel 27 so that a prestressing of the spindle 23 is effected through nut 24, worm wheel 27 and roll housing 21.

When the components are assembled as shown and the tightening nuts 24 and 25 are drawn up so tightly on the spindle 23 that no play exists between housings 21, 22 and the nuts and also no prestressing of any moment, the distance between the roll housings is determined by a given total height of the spacing means.

If the thread of the nut 28 has the same pitch as the thread of the tightening nut 24 and if the nut 24 is held against rotation by engagement of pivoted pawl 24a with the teeth of the gear 24b provided on the nut and with the nut 25 capable of rotation, upon rotation of the worm wheel 27, roll housing 21 may be raised or lowered depending on the direction of rotation of the spindle, with roll housing 22 remaining in its initial position. The adjusting force at the worm wheel 27 corresponds to the load to be lifted and with the friction torque occurring due to the stressing of the tightening nuts.

Figures 3 and 5 disclose a 3-high rolling mill in which middle roll housing 41 is fixed with upper and lower roll housings 41 and 42 respectively being movable.

The respective roll housings have bores which are in alignment and spindle 44 which is positioned in the bores of the housings is fixed against rotation by a key 52 positioned in a groove formed in the middle of fixed roll housing 41. The spindle 44 is exteriorly threaded at its ends to receive tightening nuts 50 and between each tightening nut and the exposed or outer face of each of the housings 42 and 43 is positioned a worm wheel 48 having an internal annular extension 48a located between the outer periphery of the spindle 44 and the wall of the bore in the respective roll housing. A sleeve 46a also surrounds the spindle and is provided with serrations or teeth 47 which interlock with similar serrations on the extension 48a of the worm wheel 48. The opposite end of the sleeve 46a terminates in an annular adjusting element 46 having internal threads which coact with external threads of a nut 45 threaded onto the spindle 44. One nut 45 is located immediately above the fixed housing 41 and the other immediately below such housing.

The tightening nuts 50 are adapted to be rotatably connected to the worm wheels 48 by means of pivoted pawls 51 and each worm wheel is rotated by means of a worm 49.

In this embodiment, if the pitch of the adjusting element 46 is the same as that of the nuts 50, then the roll housings 42 and 43 adjust themselves respecting the middle roll housing 41 depending on the direction of rotation of the worm wheels 48. The tightening nuts 50 follow these movements due to the same thread pitch so that the distance of a tightening nut respecting the element 45 remains the same.

Especially referring to Figure 5, it is shown that the middle roll housing 41 is fixed by stands 53 which are supported by a base plate 54. The three rolls mounted in pairs of roll housings 41, 42, and 43 are designated with 55. The roll housings are joined at 56 and 57.

The worms 49 for driving each adjusting assembly are driven by hand wheels 58 over worms 60, worm wheels 59 and shafts 61. The driving device according to Figure 4 for four adjusting mechanisms of a 2-high rolling mill according to Figure 1 is constructed similarly. In this case, two worm wheels 7 each are driven by an electro motor M with worm N, worm wheel O, shaft P, and worm 6.

The lower roll mounted in two roll housings 2 is designated with R in Figure 4. The motors M which can be synchronized to each other, are based on socles P which are fixed to the roll housings 2.

What is claimed is:

1. In an adjusting mechanism for varying the spacing between at least two elements that are normally disposed in spaced relation and have aligned bores therein, elongated stay means disposed in the bores, clamping means including nut means spaced along and cooperable with the stay means to apply a compressing force on the elements in a direction toward one another, spacer means between the elements and including a pair of cooperable annular members surrounding the stay means, one of said members being turnable relative to one element and the other of said members being fixed relative to the other element, said annular members being in threaded engagement with one another, means for turning said one annular member so as to effect relative axial movement between said members and thereby move one of said elements relative to the other, means operatively associated with at least one of said nut means whereby responsive to turning movement of said one annular member, said nut means is adjusted axially in the same measure and direction as the adjusting movement imparted to the movable one of said elements and the axially movable one of said annular members, said turnable member comprising a worm wheel keyed to the stay means for rotation therewith, yet capable of axial movement relative thereto, said worm wheel having an annular groove therein, provided with a male thread, and the other of said annular members comprising an annular nut having a female thread cooperable with the male thread so that rotation of the worm wheel effects relative axial movement between the worm wheel and the annular nut.

2. In an adjusting mechanism for varying the spacing between at least two elements that are normally disposed in spaced relation and have aligned bores therein, elongated stay means disposed in the bores, clamping means including nut means spaced along and cooperable with the stay means to apply a compressing force on the elements in a direction toward one another, spacer means between the elements and including a pair of cooperable annular members surrounding the stay means, one of said members being turnable relative to one element and the other of said members being fixed relative to the other element, said annular members being in threaded engagement with one another, means for turning said one annular member so as to effect relative axial movement between said members and thereby move one of said elements relative to the other, means operatively associated with at least one of said nut means whereby responsive to turning movement of said one annular member, said nut means is adjusted axially in the same measure and direction as the adjusting movement imparted to the movable one of said elements and the axially movable one of said annular members, and said means for turning said one annular member being located on the side of the element to be adjusted that is remote from the space between the elements in which the spacer means is located.

3. An adjusting mechanism as claimed in claim 2, in which the means for turning said one annular member is a worm wheel keyed to the stay means for rotation therewith, said turnable member having a male thread and being keyed to the stay means for rotation therewith, and the other annular member being a further nut means provided with a female thread cooperable with the male thread on the turnable member so that rotation of the stay means by said worm wheel effects relative axial movement between the turnable member and the further nut means and thus moves said other element relative to said one element.

4. In an adjusting mechanism for varying the spacing between at least two elements that are normally disposed in spaced relation and have aligned bores therein, elongated stay means disposed in the bores, clamping means including nut means spaced along and cooperable with the stay means to apply a compressing force on the elements in a direction toward one another, spacer means between the elements and including a pair of cooperable annular members surrounding the stay means, one of said members being turnable relative to one element and the other of said members being fixed relative to the other element, said annular members being in threaded engagement with one another, means for turning said one annular member so as to effect relative axial movement between said members and thereby move one of said elements relative to the other, means operatively associated with at least one of said nut means whereby responsive to turning movement of said one annular member, said nut means is adjusted axially in the same measure and direction as the adjusting movement imparted to the movable one of said elements and the axially movable one of said annular members, said last-mentioned means including means locking said one nut means to one of the elements, means mounting the stay means for rotation and further means securing the turnable member to the stay means.

5. In an adjusting mechanism for varying the spacing between at least two elements that are normally disposed in spaced relation and have aligned bores therein, elongated stay means disposed in the bores, clamping means including nut means spaced along and cooperable with the stay means to apply a compressing force on the elements in a direction toward one another, spacer means between the elements and including a pair of cooperable annular members surrounding the stay means, one of said members being turnable relative to one element and the other of said members being fixed relative to the other element, said annular members being in threaded engagement with one another, means for turning said one annular member so as to effect relative axial movement between said members and thereby move one of said elements relative to the other, means operatively associated with at least one of said nut means whereby responsive to turning movement of said one annular member, said nut means is adjusted axially in the same measure and direction as the adjusting movement imparted to the movable one of said elements and the axially movable one of said annular members, said stay means comprising a spindle, means fixing said spindle relative to one element, said turnable annular member having a tubular extension surrounding the spindle and disposed between the spindle and the other element, said means for turning said turnable annular member being disposed on the side of the element to be adjusted that is remote from the space between the elements, and said last named means being coupled with said tubular extension.

6. An adjusting mechanism as claimed in claim 5 in which said means for turning said annular member is a worm wheel having a tubular extension surrounding said spindle and coupled with the first named tubular extension and one of said nut means engaging said worm wheel.

7. In an adjusting mechanism for varying the spacing between at least two elements normally disposed in spaced relation and having aligned bores therein and at least one of said elements being movable relative to the other, elongated stay means disposed in the bores, clamping means including nut means spaced along and cooperable with the stay means for applying a compressing force on the elements in a direction toward one another, spacer means between the elements including a pair of cooperable rigid annular members surrounding the stay means, and capable of transmitting the pressure force exerted by the nut means and the stay means, one of said annular members being turnable relative to one element and the other of said annular members being fixed relative to the other element, said annular members being in threaded engagement with one another so that one annular member can move axially relative to the other, an adjusting movement imparting means operatively associated with said turnable annular member and with the nut means on the side of the movable element remote from the space between the elements for simultaneously turning said turnable annular member and axially moving said last-mentioned nut means in the same direction and for the same distance as the movement of the axially movable one of said annular members and the movable one of said elements, so that the spacing between said last-mentioned nut means and the axially movable one of said annular members always remains the same.

8. In an adjusting mechanism as claimed in claim 7 and said adjusting movement imparting means including a rotatable member located between the elements and a drive connection between said turnable member and the turnable one of said annular members.

References Cited in the file of this patent

UNITED STATES PATENTS

| 1,606,906 | Smith | Nov. 16, 1926 |
| 1,730,642 | Budd et al. | Oct. 8, 1929 |
| 2,506,681 | Norlindh | May 9, 1950 |
| 2,575,231 | O'Malley | Nov. 13, 1951 |